INVENTOR.
DANIEL H. McKEOUGH
BY
OSTROLENK, FABER, GERB & SOFFEN
ATTORNEYS

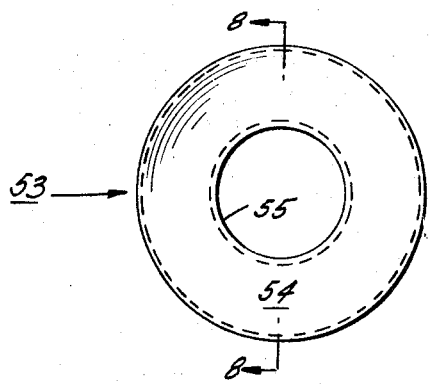
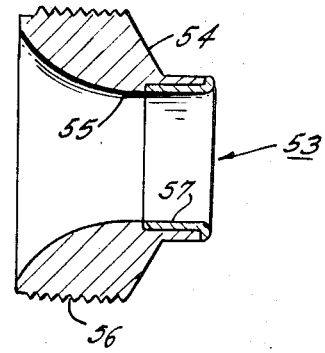
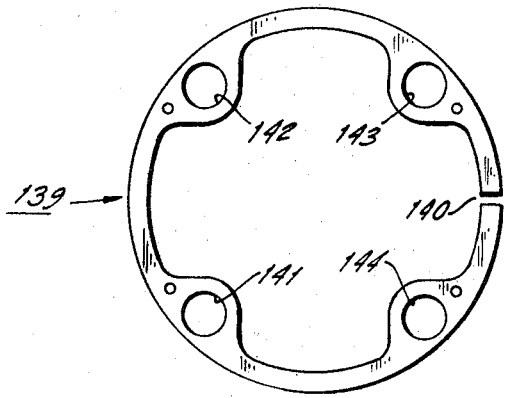
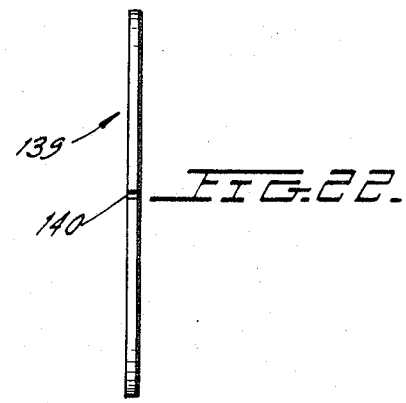
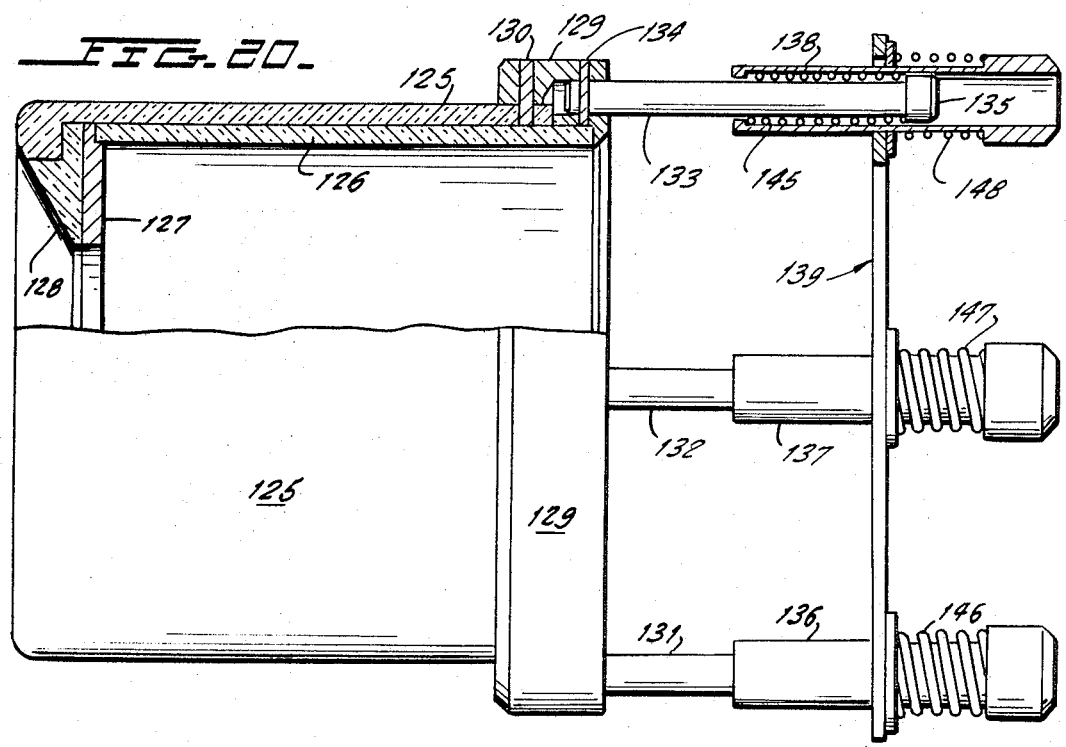

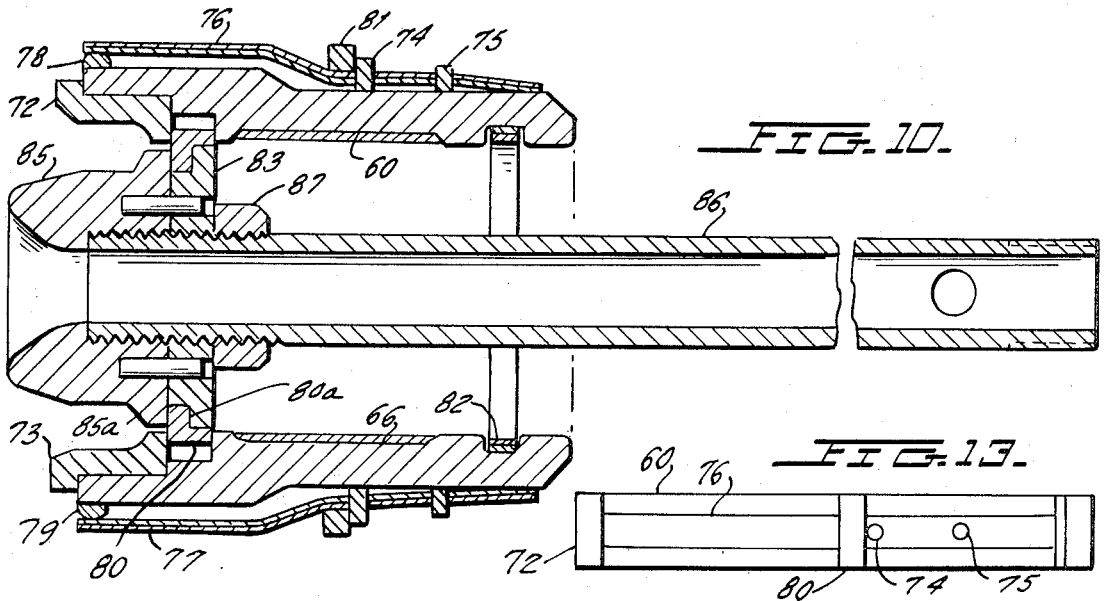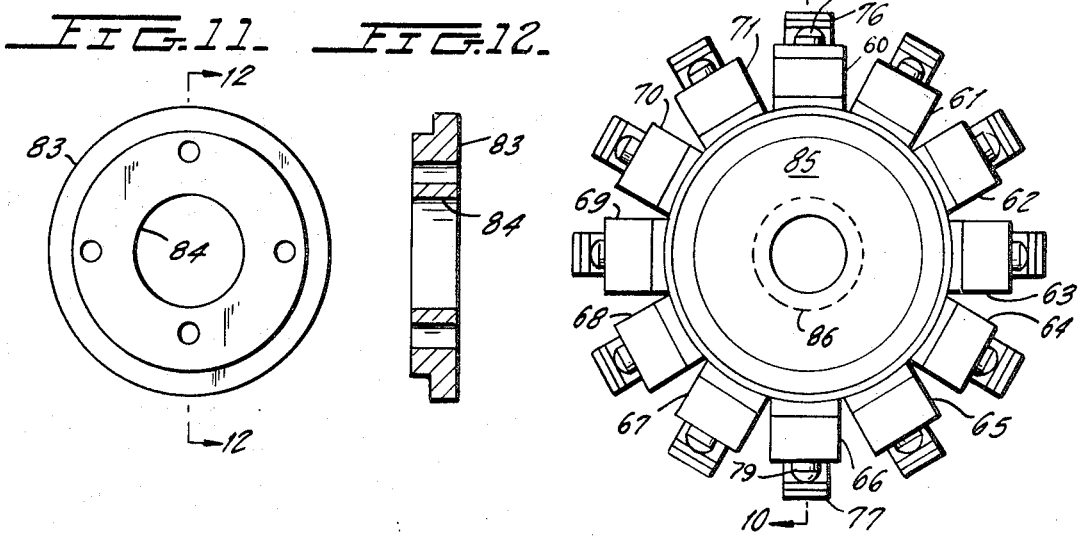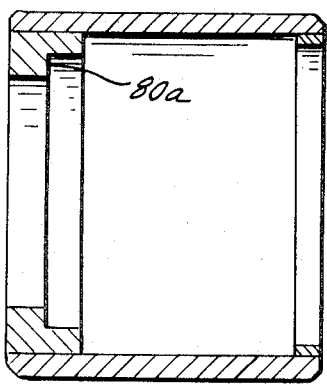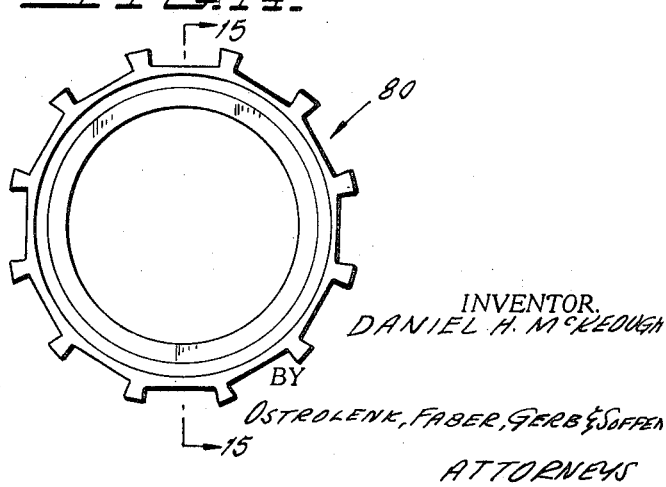

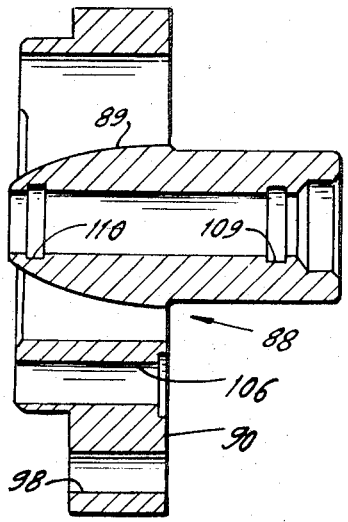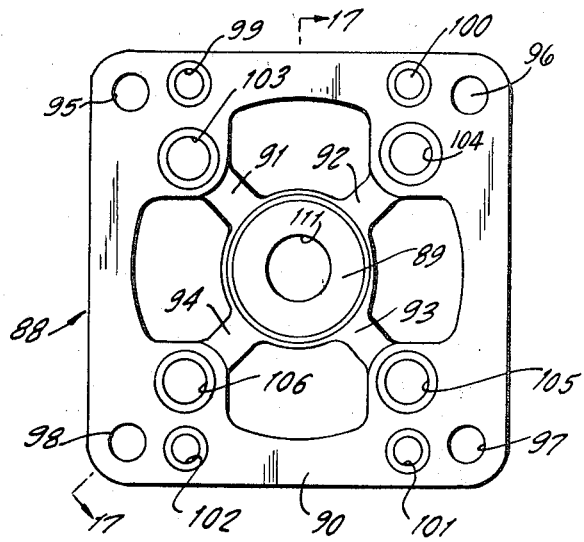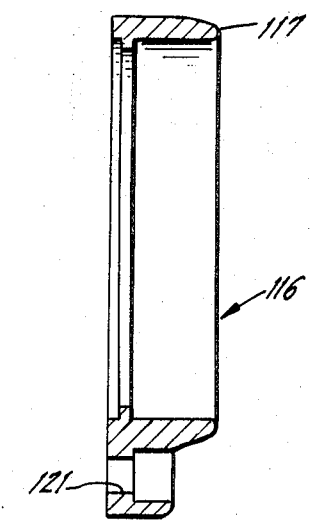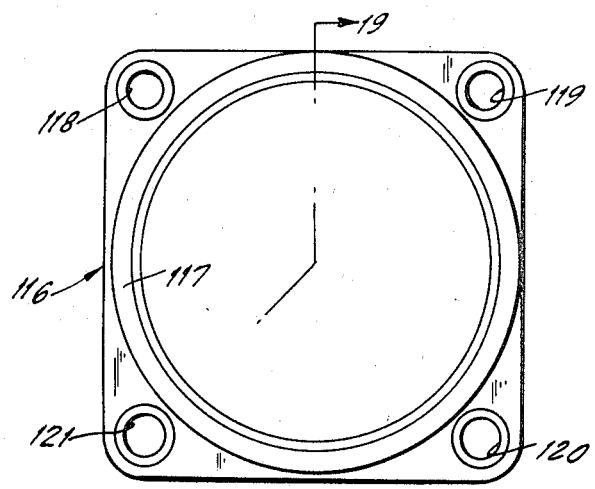

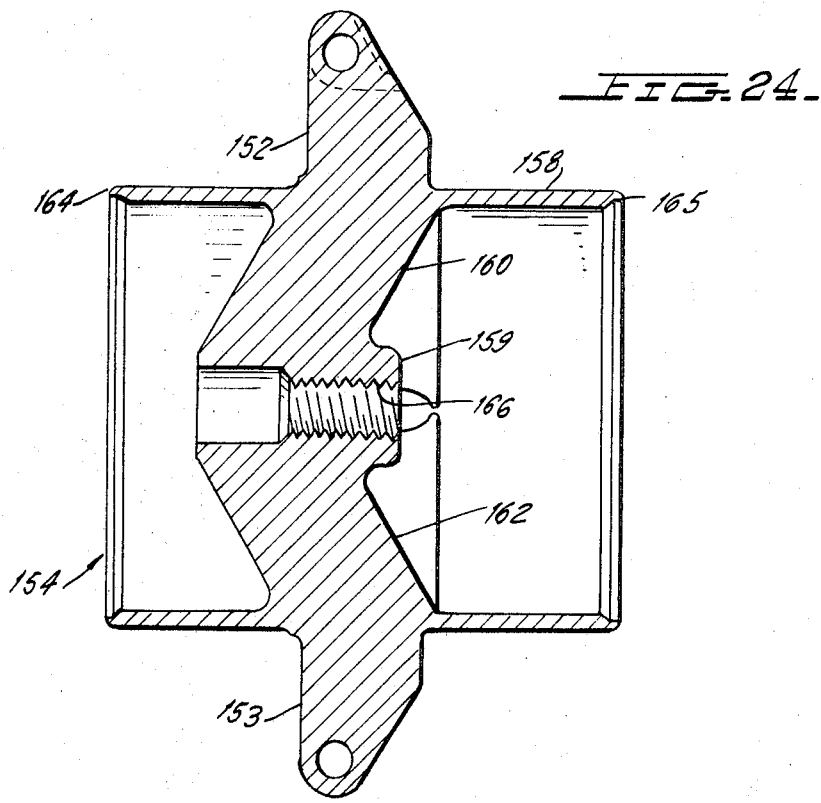
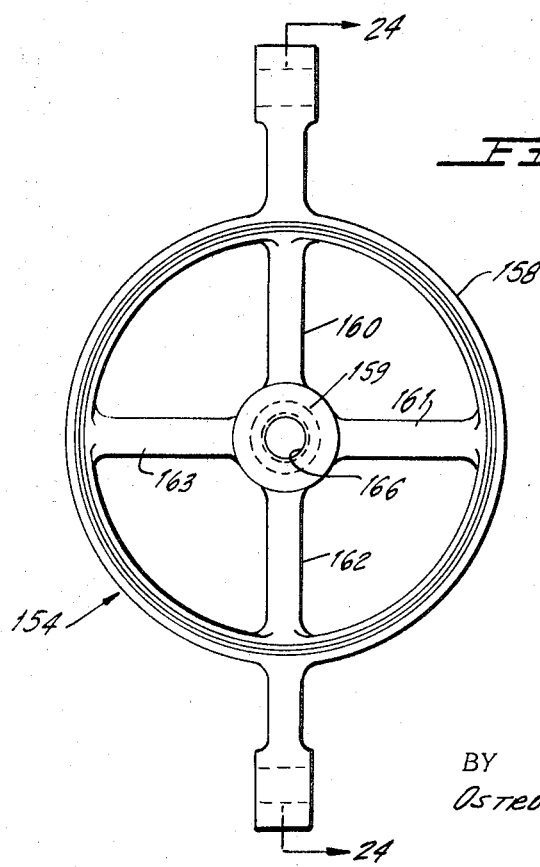

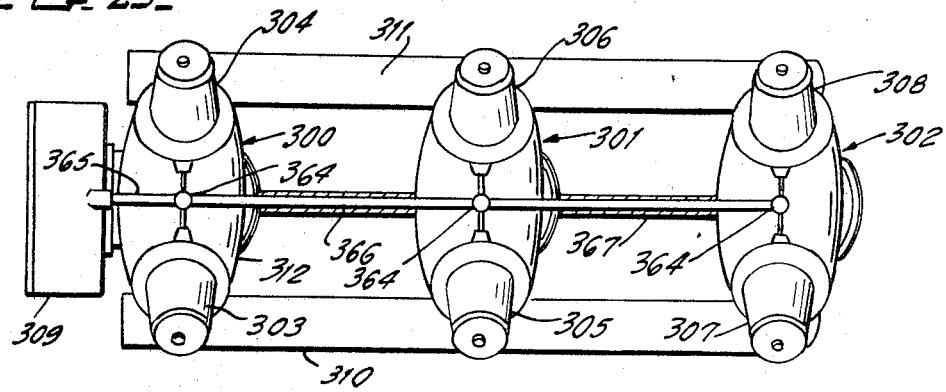
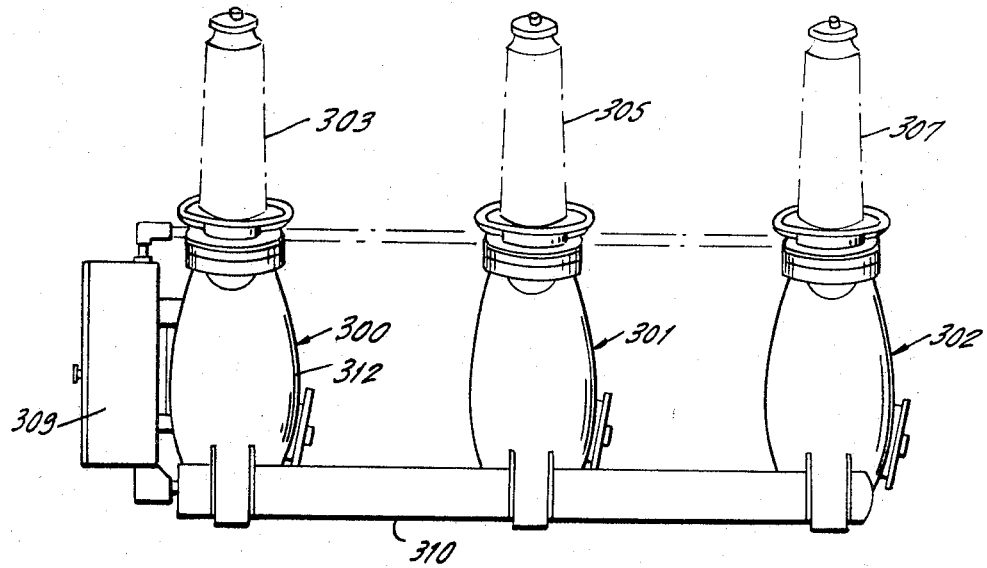
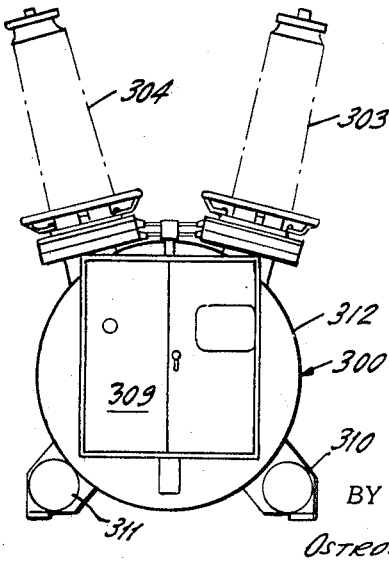

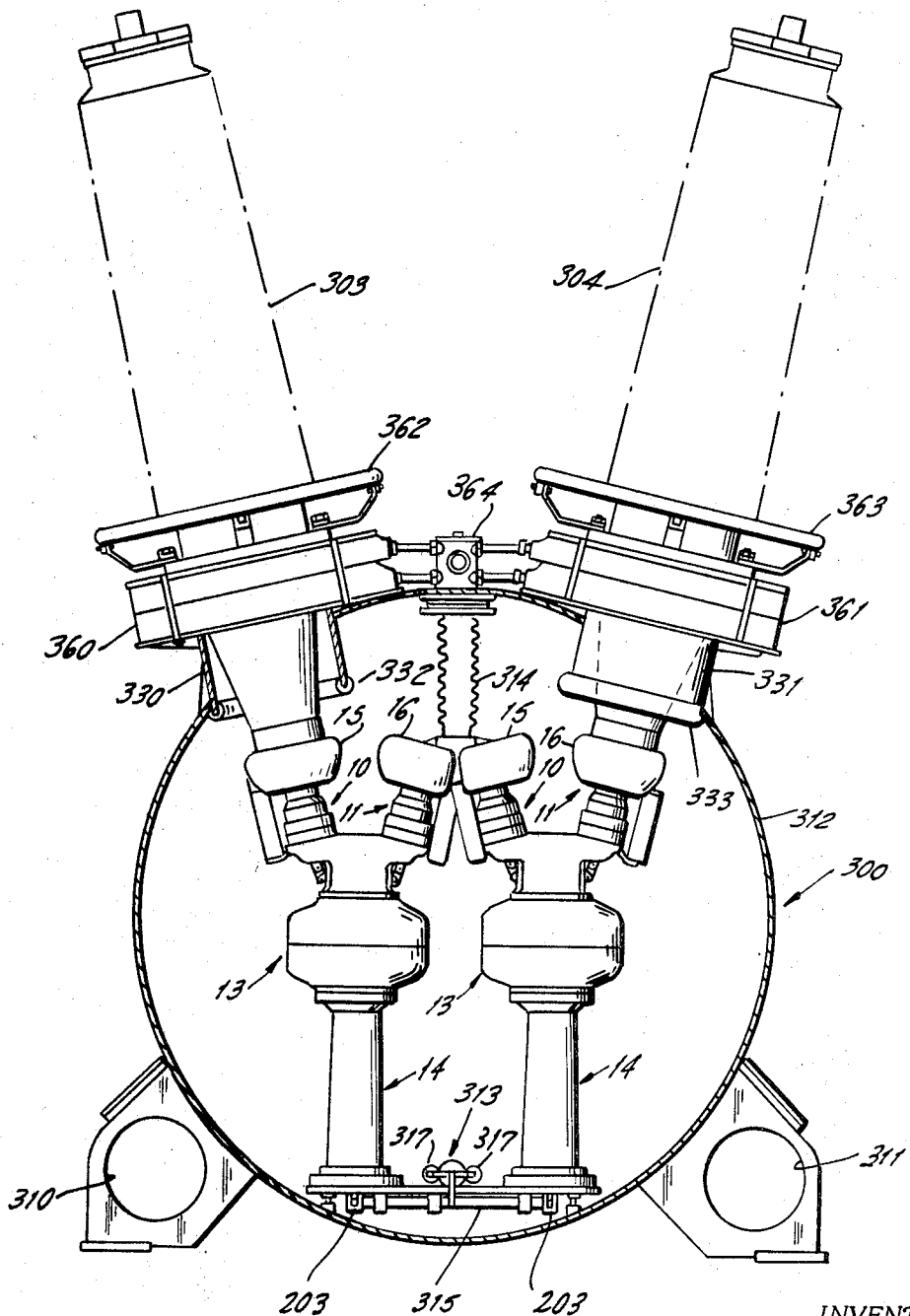

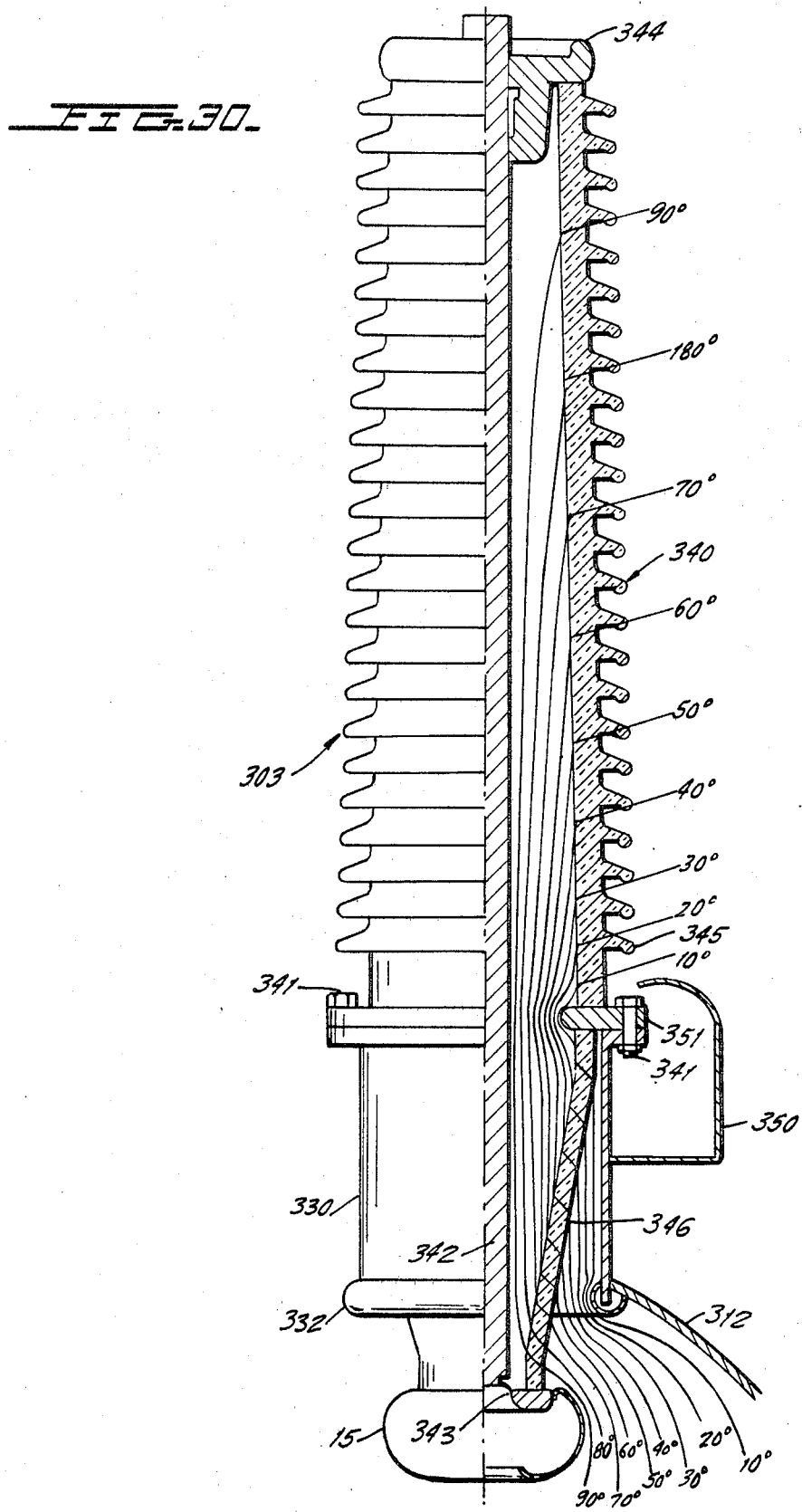

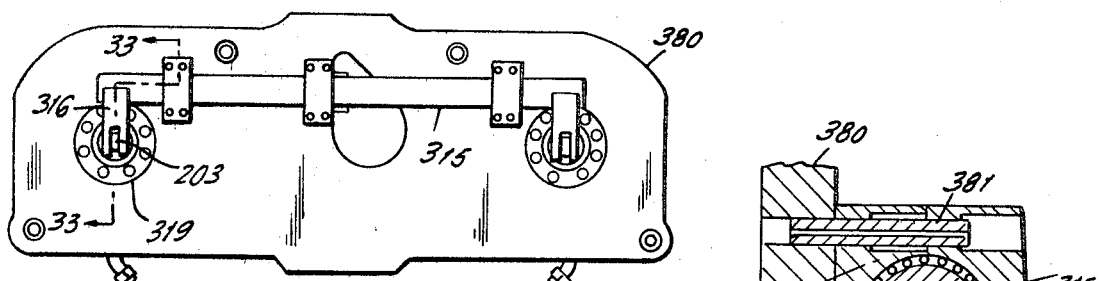
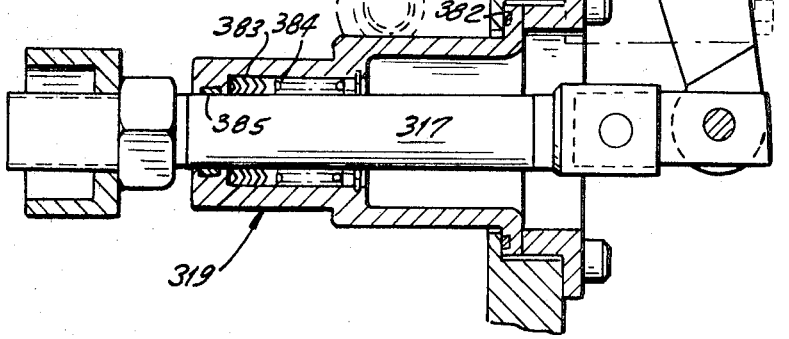
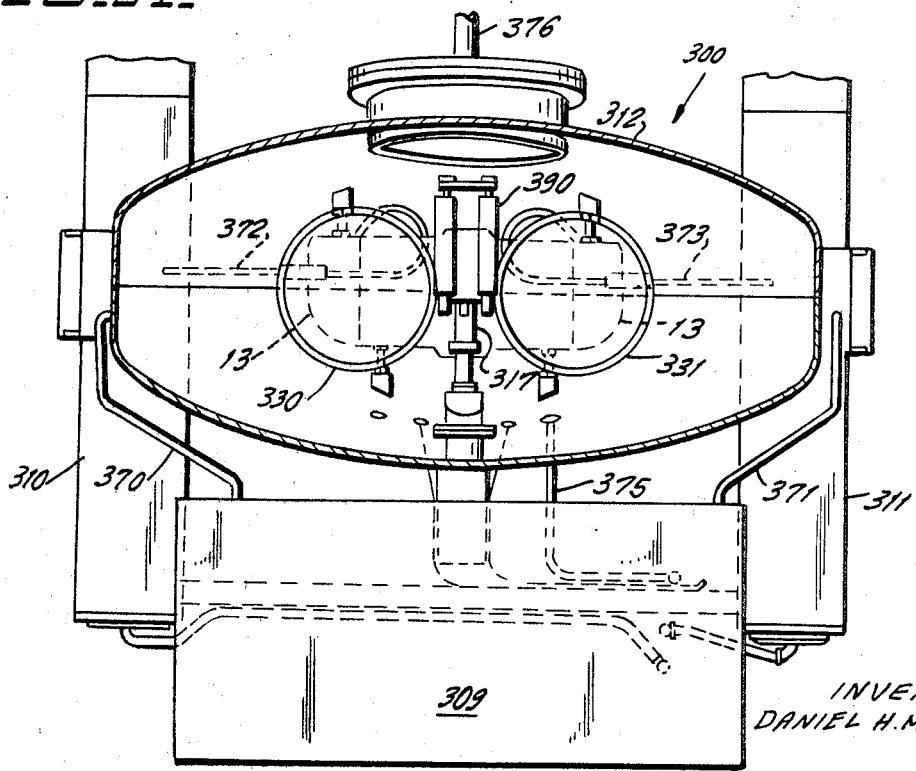

3,526,734
DEAD TANK GAS BLAST CIRCUIT BREAKER WITH INTERRUPTER STRUCTURE IMMERSED IN LOW PRESSURE OF DEAD TANK

Daniel H. McKeough, Pasadena, Calif., assignor, by mesne assignments, to I-T-E Imperial Corporation, Philadelphia, Pa., a corporation of Delaware
Filed Nov. 6, 1967, Ser. No. 680,849
Int. Cl. H01h 33/82
U.S. Cl. 200—148                                8 Claims

ABSTRACT OF THE DISCLOSURE

An interrupter structure comprises a stationary contact structure which is axially, laterally and angularly adjustable. A support disk threadably receives the stationary contact and has an internal groove that permits tightening of the web interior on the stationary contact external threads. The support disk also has enlarged bolt receiving openings to permit its lateral adjustment. A movable contact has a plurality of inwardly biased fingers that have a limited inward collapse and are surrounded by a movable interrupter cylinder that moves into engagement with the bottom of the stationary contact and is mounted on spring biased pins which bias the movable interrupter tube open. A mechanism having outwardly extending ears carries a blast valve assembly in a casting which mounts the interrupter tube on a high pressure tank. The outward extending ears are connected to the ends of the movable contact assembly. A main operating shaft which extends through a main support insulator for each pole is connected to the blast valve through a spring coupling and moves the blast valve and contact with the valve moving from one seat to another to permit a gas blast from the high pressure tank as the contacts and blast valve are moved. The main support insulators, which are hollow, are mounted within main support housings for each pole of a three pole breaker. Each of the main housings are mounted on grounded main pressure suply tanks along with a control housing. An operating rod extending from the control housing through a flexible bellows is connected by sealed piping to each of the operating shafts of each of the poles.

---

This invention relates to high voltage gas blast circuit breakers, and more particularly relates to a novel dead or grounded tank circuit breaker arrangement.

This invention is related to copending applications Ser. No. 680,778, filed Nov. 6, 1967, in the name of John H. Golota, entitled "Adjustable Contact Nozzle and Retractable Arcing Chamber for Gas Blast Circuit Breakers"; Ser. No. 680,777, filed Nov. 6, 1967, in the name of John H. Golota, entitled "Axially Vented Contact and Interrupter Structure for Gas Blast Circuit Breakers"; and Ser. No. 547,621 filed May 4, 1966, in the name of Daniel H. McKeough, entitled "Slide Valve for Gas Blast Breakers," now U.S. Pat. 3,436,505 and are all assigned to the assignee of the present invention.

In accordance with the invention, a novel dead or grounded tank arrangement is provided for a three pole gas blast circuit breaker in which each pole has respective conductive tanks which are mounted along with a common control cabinet and pressure gas supply cylinders. The interrupters of each pole are then mounted within the main tanks and carry their respective main high pressure supply connected to the main pressure cylinders, with the remainder of the tank at relatively low pressure. Conduits or pipes extend between the individual tanks to carry movable operating shafts and current transformer leads between the tanks.

Each of the tanks has a pair of bushings entering therethrough which are surrounded by novel cylindrical shields which shape the electrostatic stresses around the bushings to permit use of flattened main tanks to permit a smaller gas capacity for the tank.

Accordingly, a primary object of this invention is to provide a novel dead tank gas blast three phase circuit breaker that can be used at operating line-to-line voltages of up to 362 KV.

Another object of this invention is to provide a novel dead tank gas blast circuit breaker that is compact and uses a relatively small volume of gas.

A further object of this invention is to provide a novel electrostatic field control means for tanks having bushings extending therein.

Another object of this invention is to provide a novel tank structure for high voltage gas blast breakers that is leak-free.

These and other objects of this invention will become apparent from the following description when taken in connection with the drawings, in which:

FIG. 7 is a top view of the stationary contact of the interrupter of FIG. 2.

FIG. 8 is a cross-section view of the contact of FIG. 7 taken across the section line 8—8 in FIG. 7.

FIG. 9 is a top view of the movable contact assembly of FIGS. 1 and 2.

FIG. 10 is a cross-section of FIG. 9 taken across the section line 10—10 in FIG. 9.

FIG. 11 is a top view of the locking disk of FIG. 10.

FIG. 12 is a cross-section view of FIG. 11 taken across section line 12—12 in FIG. 11.

FIG. 13 is a front view of one of the contact fingers of FIG. 10.

FIG. 14 is a top view of the contact finger retainer of FIG. 10.

FIG. 15 is a cross-section view of FIG. 14 taken across the section line 15—15 in FIG. 14.

FIG. 16 is a top view of the interrupter support.

FIG. 17 is a cross-section of FIG. 16 taken across the section lines 17—17 in FIG. 16.

FIG. 18 shows a top view of the interrupter tube flange.

FIG. 19 is a cross-section of FIG. 18 taken across section line 19—19 in FIG. 18.

FIG. 20 is a plan view, partially in section, of the movable interrupter tube assembly.

FIG. 21 is a plan view of the retainer of FIG. 20.

FIG. 22 is a side view of FIG. 21.

FIG. 23 is a top view of the cylindrical air control valve.

FIG. 24 is a cross-section view of FIG. 23 taken across section line 24—24 of FIG. 23.

FIG. 25 is a top plan view of a three-pole dead tank circuit breaker arrangement using the interrupters of FIGS. 1 and 2 for each respective pole.

FIG. 26 is a side plan view of FIG. 25.

FIG. 27 is an end plan view of FIG. 25.

FIG. 28 shows a partial cross-sectional end view of one pole of FIGS. 25 to 27.

FIG. 30 is a partial cross-sectional view of one of the terminal bushings of FIGS. 25 to 29.

FIG. 31 is a top, partial cross-sectional view of FIGS. 28 and 29.

FIG. 32 is a front plan view of a portion of the operating mechanism of FIGS. 28 and 29.

FIG. 33 is a cross-sectional view of FIG. 32 taken across section line 33—33 in FIG. 32.

Figure 1:
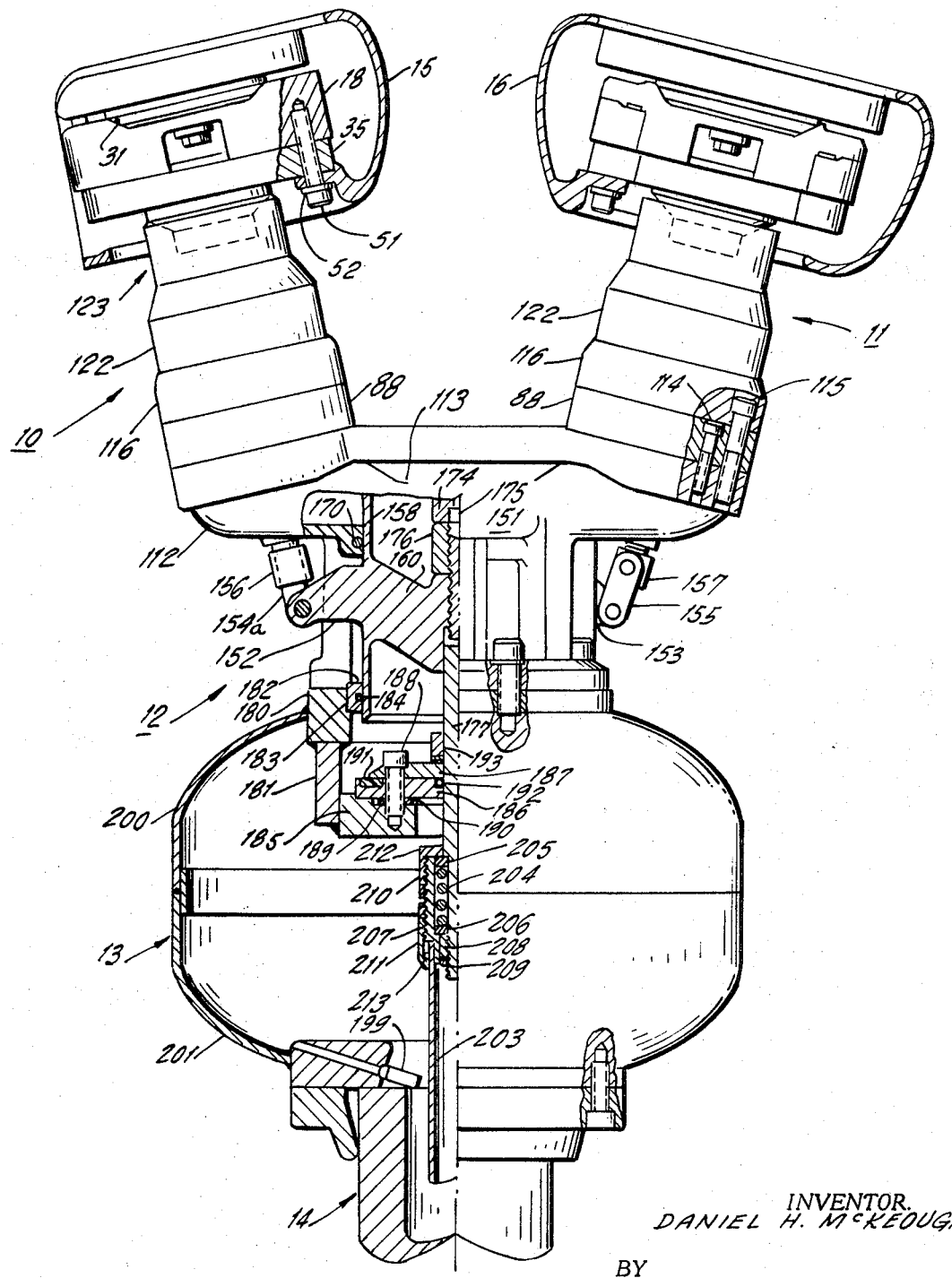
FIG. 1 is a side view, partially in section, showing an entire assembly of the interrupters and operating mechanism of a circuit breaker made in accordance with the present invention.

FIG. 1 shows the assembly of the novel interrupter assembly of the invention, and illustrates two series connected interrupters 10 and 11. Interrupters 10 and 11 are identical and will be described in detail hereinafter. The interrupters 10 and 11 are controlled by an operating mechanism, generally indicated by numeral 12, which is supported on a tank housing 13. Tank housing 13 is, in turn, carried on an elongated insulation pedestal 14 which may be carried on a high pressure gas supply at ground potential, as will be later described in FIGS. 25 to 29.

Figure 2:
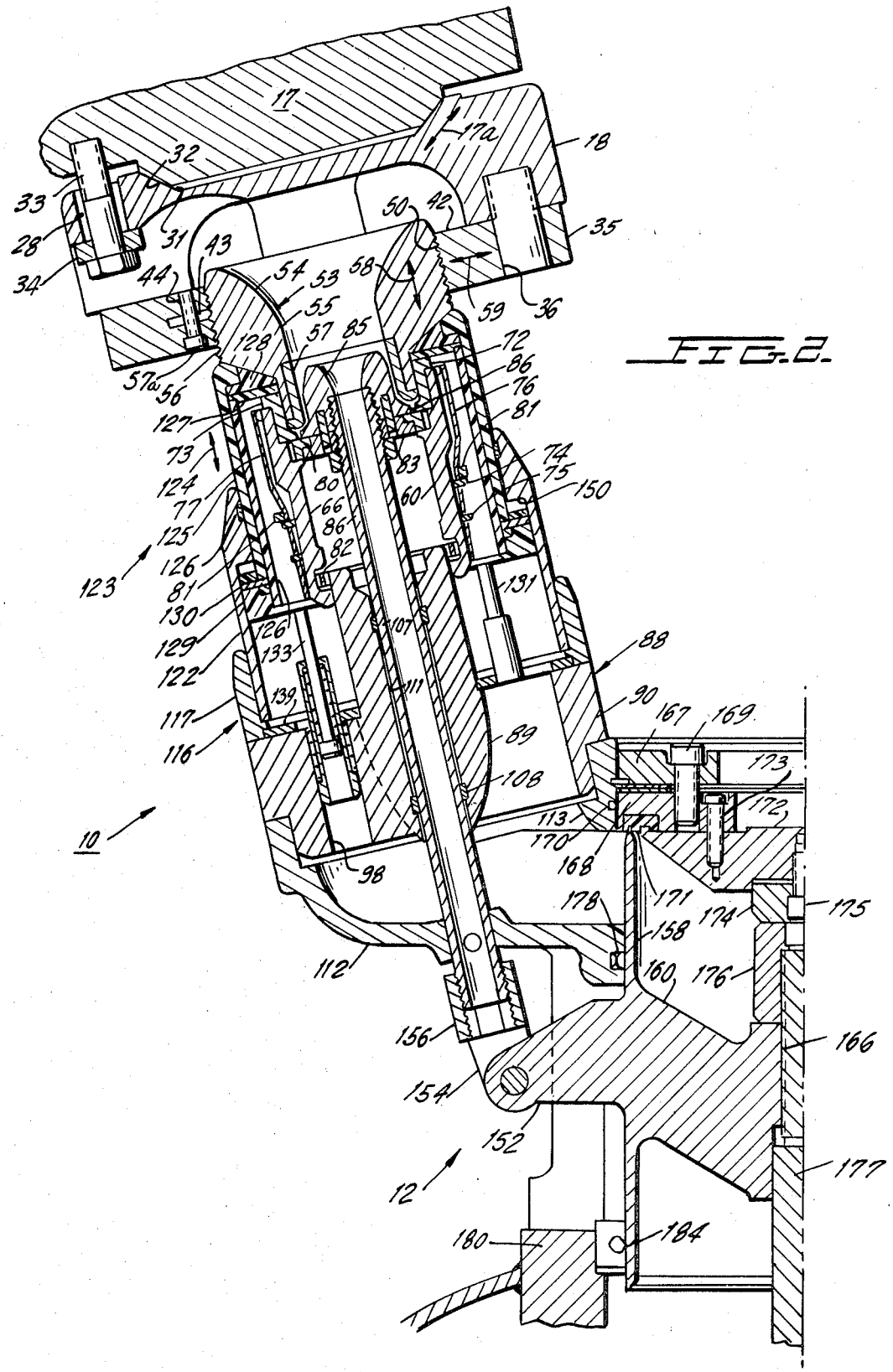
FIG. 2 is a cross-sectional view of one of the interrupter assemblies of FIG. 1.

Each of interrupters 10 and 11 are connected at their tops to insulator bushings, to be later described, which are connected in series with the circuit to be protected. The connection surrounding the tops of interrupters 10 and 11 and the insulator bushings are covered with corona shields 15 and 16. FIG. 2 shows the connection of interrupter 10 to a lower portion 17 of an insulator bushing connected thereto.

Figure 3:
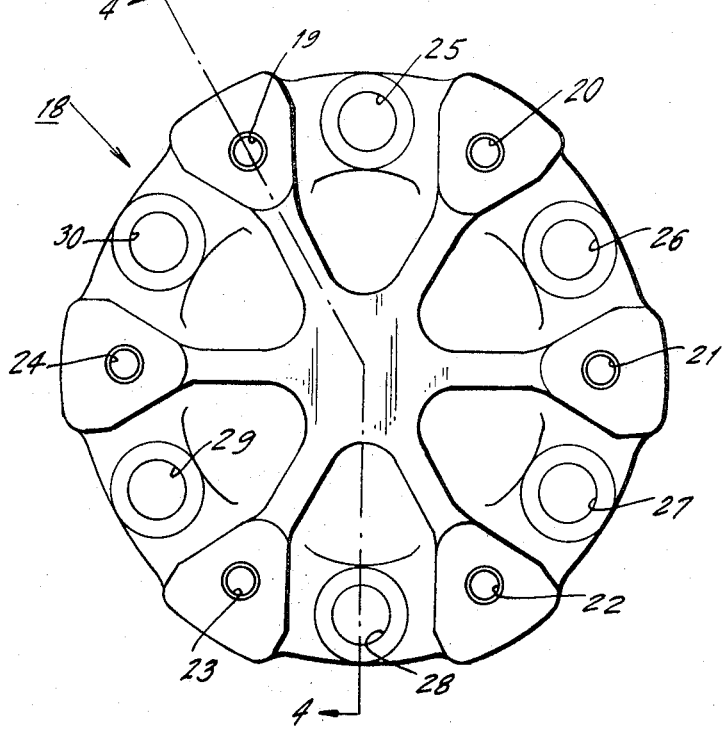
FIG. 3 is a top view of the upper adaptor of FIGS. 1 and 2.
Figure 4:
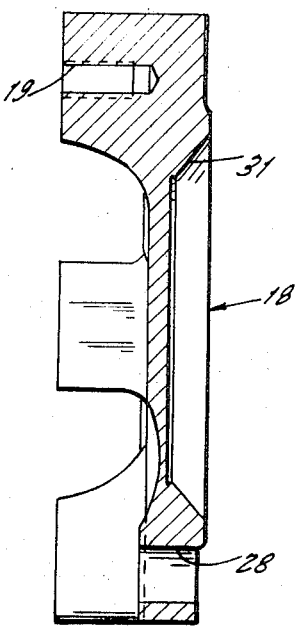
FIG. 4 is a cross-section of FIG. 3 taken across the section line 4—4 in FIG. 3.

An upper adaptor plate 18 (FIGS. 3 and 4) is provided which has a series of tapped openings therein, shown in FIG. 3 as tapped openings 19 to 24, and alternate through openings 25 to 30. The upper surface of adaptor 18 then has a conical surface 31 which engages the conical lower surface 32 of insulator 17 to permit angular adjustment of insulator 17, as shown by arrow 17a in FIG. 2. A series of bolts, such as bolt 33 having washer 34, then extend through openings, such as through-opening 28, to secure upper adaptor 18 to insulator 17.

Figure 5:
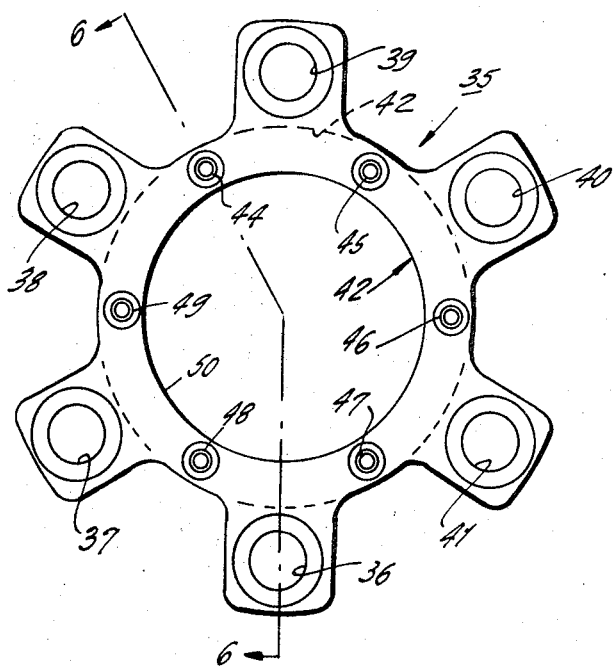
FIG. 5 is a top view of the lower adaptor of FIGS. 1 and 2 which is located below the upper adaptor of FIGS. 3 and 4.
Figure 6:
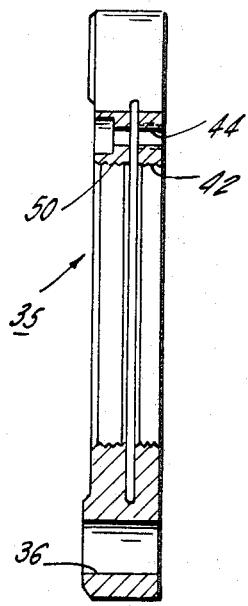
FIG. 6 is a cross-sectional view of FIG. 5 taken across the section line 6—6 in FIG. 5.

A lower adaptor 35 is then provided, as shown in FIGS. 5 and 6, which has a plurality of extending ears containing through-openings 36 to 41 extending from a central web 42. An annular groove 43 is cut through the web 42 so that it is held by the material of the extending ears. A plurality of through-holes and aligned tapped openings 44 to 49 are then formed in the web 42, and the interior web surface is threaded by thread 50. The through-openings 36 to 41 in lower adaptor 35 are then aligned with tapped openings 25 to 30 in upper adaptor 18 (FIG. 3), and suitable bolts and washers, such as bolt 51 and washer 52, shown in FIG. 1, secure shield 15 and adaptor plates 18 and 35 together.

The interior thread 50 of web 42 of lower adaptor 35 receives the stationary contact 53 of the interrupter. Contact 53 is shown in FIGS. 7 and 8 and comprises a main body 54 having a central opening 55 which tapers outwardly to define a blast orifice. The outer diameter of body 54 is threaded with a thread 56, and an arc-resistant insert 57. Thread 56 of contact 53 is then threaded into thread 50 of lower adaptor 35 and is secured therein by tightening a plurality of bolts, such as bolts 57a, shown in FIG. 2, which pass through the through-openings in the lower part of web 42 and into the threaded opening 44. As these bolts are tightened, the upper and lower interior portions of web 42 tighten on thread 56 to hold contact 53 securely. Note that the axial contact position is easily controlled by threading contact 53 more or less into thread 50, as shown by arrow 58 in FIG. 2. Moreover, by providing clearance between the outer diameter of the bolts, such as bolt 51, which secure lower adaptor 35 to upper adaptor 18 and the corresponding through-openings, such as opening 36, lateral adjustment can be obtained for contact 53, as shown by arrow 59 in FIG. 2.

The movable contact assembly of FIGS. 1 and 2 is best shown in detail in FIGS. 9 to 15.

The movable contact assembly is composed of a circular cluster of contact fingers 60 to 71, each having generally rectangular shape, shown in FIG. 13 for contact 60. Each of the contact fingers have arc-resistant inserts secured thereto, such as inserts 72 and 73, secured to contacts 60 and 66, respectively. Each of the contact fingers have two projections, such as projections 74 and 75, for finger 60 in FIGS. 10 and 13, which receive biasing leaf springs, shown as leaf springs 76 and 77 for contacts 60 and 66 which bear on insulation buttons 78 and 79, respectively.

The contacts 60 to 71 are laid on the outer notches in contact retainer 80, shown in FIGS. 14 and 15, and are held on the retainer 80 by a spring retainer 81 which encircles the central exterior portions of the contacts. A spring 82, shown in FIG. 10, extends around the bottom interior of the contacts.

A locking disk 83, shown in FIGS. 11 and 12, having a central opening 84, is inserted into retainer 80 and into engagement with shoulder 80a of retainer 80. A movable arcing contact 85 is then secured to locking disk 83, as by pins extending from disk 83 to arcing contact 85. It will be noted that arcing contact 85 has a bottom flange 85a which has an outer diameter that engages the arcing contact tips of the arcing contact fingers to limit their inward collapse and to provide commutation of the arc from insert 72 to contact 85 during opening. The interior of arcing contact 85 is threaded and threadably receives the end of operating shaft 86 and is secured thereon by locking nut 87, best shown in FIG. 10.

FIGS. 16 and 17 show the interrupter support 88 for slidably holding the movable contact assembly of FIG. 10. Support 88 contains a central stationary contact portion 89, the outer end of which slidably receives the lower ends of contact fingers 60 and 71 in slidable engagement. Central portion 89 is connected to base portion 90 by four streamlined webs 91, 92, 93 and 94 (FIG. 16). Base 90 has two sets of four through-openings 95 to 98 and 99 to 102 in the corners thereof, and a set of through-openings 103 to 106, respectively, in the corners thereof. Two rings 107 and 108 of insulating material, shown in FIG. 2, are contained in internal grooves 109 and 110, respectively, in the central opening 111 of central portion 89, shown in FIGS. 15 and 16, to seal around the operating rod 86, and to provide electrical insulation between rod 86 and base 90 as shown in FIG. 2. Support 88 is then fastened to support casting sections 112 and 113 (which are parts of a common casting) of FIGS. 1 and 2, as by bolts which pass through openings 95 to 102 into appropriate tapped openings in casting sections 112 and 113, partly shown in FIG. 1 by bolts 114 and 115. Note that the operating rod 86 passes through a suitable opening, which may be sealed, in casting section 112.

An interrupter tube assembly, arranged above the support 88 and enclosing the contact area is carried on a flange 116, shown in FIGS. 18 and 19. Flange 116 comprises an extending cylindrical portion 117 and four through-openings 118 to 121 in the corners thereof. Flange 116 is secured to support 88 beneath it by the four bolts (not shown) extending through openings 118 to 121 in flange 116 and respective openings 95 to 98 in support 88 (FIG. 16), which bolts are threaded into the castings 112 and 113.

An interrupter tube 122 is then secured to extension 117 in any suitable manner, where tube 122 is of glass fiber, or the like. Tube 122 then slidably receives the movable interrupter tube portion 123, which is movable in the direction of arrow 124, with a gasket 125 between the surfaces of tube 122 and sliding portion 123.

The sliding interrupter tube portion 123 is best understood by reference to FIGS. 20, 21 and 22. Referring to FIG. 20, the movable interrupter tube comprises an outer insulation cylinder 125 and an inner lining cylinder 126 which secure, between them, an insulation lining disk 127 and baffle ring 128. The bottom of the cylinders are secured by ring 129 which has a lower lip extending below liner 126 and a plurality of pins, such as pin 130, which extend into cylinder 125.

Four pins, three of which are shown as pins 131, 132 and 133 in FIG. 20, then extend into openings in ring 129 and are locked therein by suitable locking pins, such as locking pin 134 for pin 133. Pins 131 and 133 are seen in FIG. 2 with the four pins disposed 90° from one another. Each of the pins have enlarged heads such as head 135 of pin 133, shown in FIG. 20, which are captured in housings, such as housings 136, 137 and 138 for pins 131 to 133, respectively. A split retainer spring disk 139, shown in FIGS. 21 and 22, which is split at portion 140, has four openings 141 to 144 for receiving the four spring housings, including housings 131, 132 and 133, as shown in FIG. 20. Internal springs, such as spring 145 of housing 138, then bias the housings 136 to 138 toward the ring 129 and external springs 146, 147 and 148 bias plate 139 toward the ring 129.

In assembling the movable interrupter tube, it will be noted in FIG. 2 that the periphery of plate 139 is captured between adaptor 116 and support 88, with ring 129 beneath shoulder 150 in stationary tube portion 122. Also, it is seen that the baffle ring lies just adjacent the lower tapered surface of contact 53.

The operating mechanism for moving operating rod 86 is best shown in FIG. 1 where it is seen that the casting sections 112 and 113 have a downwardly extending portion 151. Portion 151 has two slots for passing ears 152 and 153 of cylindrical valve 154. The ears 152 and 153 are then connected to link 154a and 155, respectively, which are, in turn, pivotally connected to operating rods 86 for interrupters 10 and 11 through suitable couplings 156 and 157, respectively.

A blast valve is best shown in FIGS. 23 and 24 as comprising a cylindrical body 158 connected to a central hub 159 by streamlined arms 160 to 163. The ends of cylindrical body 158 are formed with valve disk engaging sections 164 and 165. The interior opening in hub 159 is provided with a thread 166. The two ears 152 and 153, shown above, then extend outward from cylindrical body 158.

Cylindrical valve body 158 then moves between an upper and lower valve seat. The upper valve seat is composed on an upper disk 167 which is secured to casting section 113 and a lower disk 168 which is bolted to disk 167 as by bolts such as bolt 169. Disk 168 is sealed with respect to casting section 113 by seal ring 170 and carries a main valve seat ring 171 which cooperates with the upper end of cylindrical valve body 158. A valve retaining disk 172 is bolted to disk 168 as by bolt 173 and securely holds ring 171 in position. Disk 172 also has a buffer disk 174 bolted thereto as by bolt 175 which engages nut 176 when the valve 154 is moved upwardly.

Hub 159 is threaded on operating shaft 177 and is locked in place by nut 176 which is also threaded on shaft 177. Note that an annular seal 178 is contained in casting portion 112 and seals around cylinder 158 and guides the motion of cylinder 158.

A ring 180 (FIGS. 1 and 2) is then secured to the bottom of casting 112, and downwardly projecting members 181 are welded to ring 180. Members 181 then support the lower valve seal for valve 154. Note that a ring 182 having a sealing ring 183 engaging ring 182 is provided with a sliding seal ring 184 which surrounds the lower portion of cylinder 158.

The bottom of members 181 carries a ring 185. Ring 185 is connected to valve disk 186 and valve retainer disk 187 by bolt means, such as bolt 188. Sealing rings 189 and 190 prevent leakage between rings 185 and 186. Ring 186 carries a main valve seat 191 which cooperates with the bottom of cylinder 158. Note that a sliding seal 192 is formed between disk 186 and shaft 177, and that a buffer 193 is connected to the top of disk 187 to receive the bottom of hub 159 when valve 158 moves down.

The ring 180 is welded to high pressure tank 13 which is composed of welded upper and lower halves 200 and 201, respectively. High pressure gas, such as air and preferably sulfur hexafluoride, is then supplied to the interior of tank 13 from the central channel through insulator 14 which is appropriately connected at its bottom to a high pressure gas source, as will be later described.

An elongated operating shaft 203, which extends coaxially with insulator 14, can be moved up and down by operating means, to be later described, which may be carried at ground, and is connected to shaft 177 by a shock-absorbing coupling.

FIG. 1 further shows a small tubular member extending downwardly and into the annular space between pedestal 14 and rod 203, and arranged so that any gas which condenses on the surface of housing 13 will flow downwardly and freely through the annular space without impinging on the insulating surfaces of members 14 and 203.

The coupling as shown in FIG. 1 is comprised of a spring 204 captured between rings 205 and 206 at its top and bottom, and an outer cylinder 207 on its outer periphery. Ring 205 is captured beneath a shoulder in shaft 177 as shown, while ring 206 is held by nuts 208 and 209 which are threaded on the threaded bottom of shaft 177. Outer shells 210 and 211 each have threaded interiors, threaded on the outer threaded surface of cylinder 207 with extension 212 of shell 210 bearing on ring 205, while ring 206 seats under the interior shoulder in cylinder 207. Operating shaft 203 is then connected to shell 211 by connection ring 213. When shaft 203 moves down, it will be seen that downward force is exerted through shells 211, 210, ring 205, and spring 204 on ring 206. Similarly, upward movement of shaft 203 is transmitted through cylinder 207, ring 206, spring 204, and ring 205. Thus, both upward and downward movement of shaft 203 is transmitted to shaft 177 through shock-absorbing spring 204. This also makes the mechanism relatively insensitive to small dimensional changes such as produced by misalignment and temperature changes.

FIGS. 25, 26 and 27 show plan views showing a three-pole dead tank circuit breaker, each pole using the interrupters of FIGS. 1 and 2. Referring to FIGS. 25, 26 and 27, the breaker is made up of three identical single pole units 300, 301, and 302, each of which have bushings 303–304, 305–306, and 307–308, respectively. A control cabinet 309 is secured with the poles and contains a suitable gas compressor and gas control equipment for supplying the individual pole units with gas such as sulfur hexafluoride at the proper pressure, temperature and required conditions for cleanliness. Two high pressure gas storage tanks 310 and 311 are located at the bottom of the breaker and receive the individual poles and cabinet 309 as shown. Suitable heaters (not shown) and suitable thermal insulation may be provided for tanks 310 and 311, controlled from controls in cabinet 309 to maintain the gas in tanks 310 and 311 at a high enough temperature to prevent excessive condensation.

Figure 29:
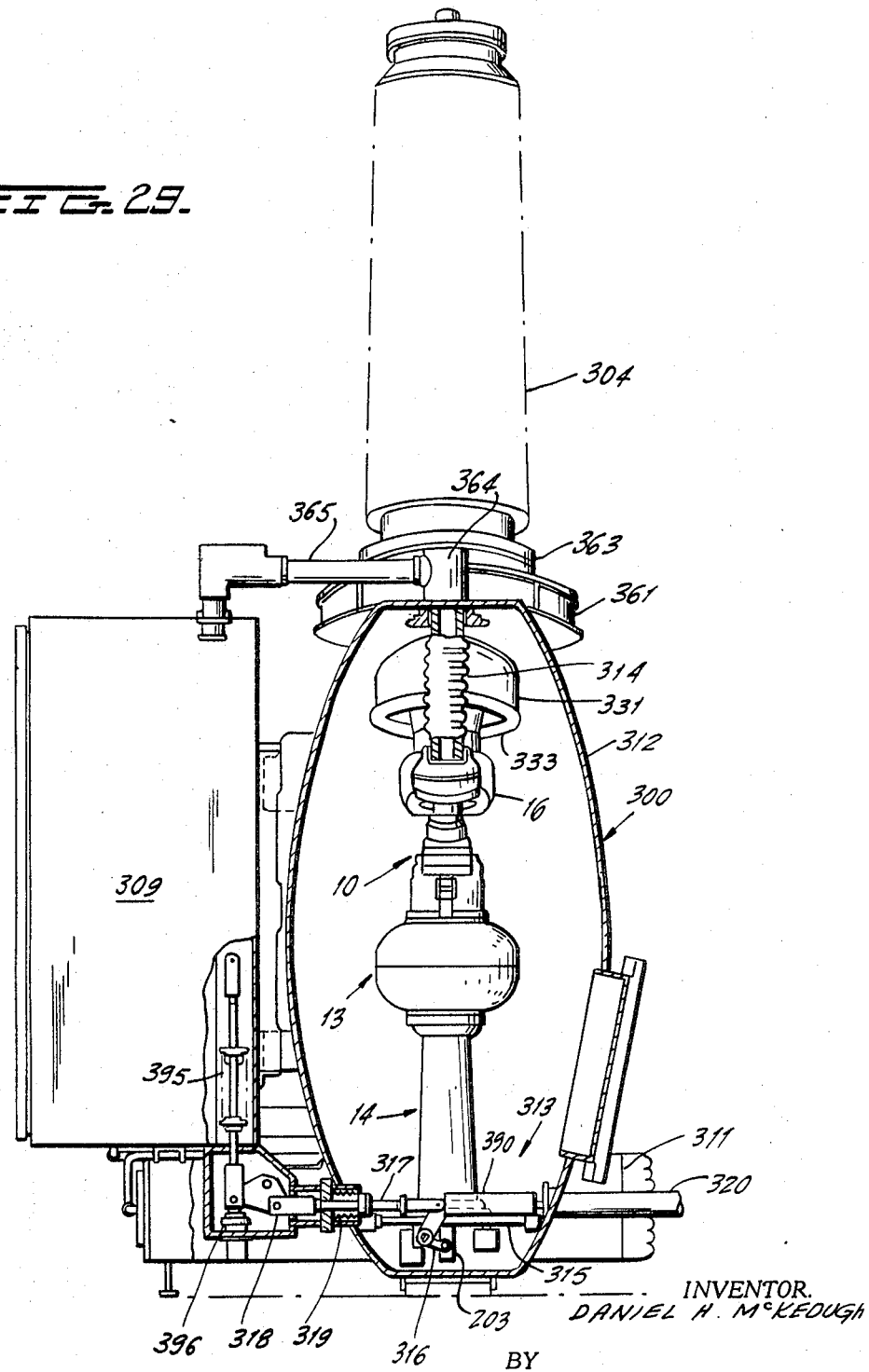
FIG. 29 shows a partial cross-sectional side view of one pole of FIGS. 25 to 27.

FIGS. 28 and 29 show sectional views of pole 300 with the tank cut away. As shown in those figures, two interrupters each identical to the interrupters of FIGS. 1 and 2 are contained within the flattened steel tank 312 of each pole to form four series connected breakers for each pole whereby the breaker can be used at operating voltages of 242 kv. maximum line-to-line voltage on the three-phase power systems. Similar arrangements may be used for lower and higher voltages, e.g., 121 to 362 kv. The tanks are formed by joining together, as by welding, two sections whose axes of revolution are horizontal center lines of each tank assembly in such a way that approximately equal clearance to ground is achieved between all live parts and the tank surface. In this way, a minimum volume of gas is used for a particular operating voltage.

The interrupting assemblies are supported on columns 14 which are fastened and supported by the pole unit mechanism 313 in such a way that the high pressure gas may be used to fill the support columns 14 up to the blast valve 154 of FIGS. 1 and 2.

The terminal bushings 303 and 304 extend down from the top of tank 312 and support the stationary contacts of the outer interrupters (contacts 53 of FIG. 2). Bushings 303 and 304 may be insulated internally by compressed gas, or may be of the solid core design.

An insulating column 314 (FIGS. 28 and 29) is supported at the top of the tank 312 and extends downwardly to support the stationary contacts of the two interior interrupters. Insulation operating rods, corresponding to operating rod 203 of FIG. 1, extend down through the support columns 14 of each of the interrupters and are connected to operating rod 315 through a crank mechanism 316 to operating rod 317. Rod 317 is connected to a bell crank assembly 318 which extends into control cabinet 309 (FIG. 29). Rod 317 is sealed by a flexible bellows 319, so that no sliding seals are used between the operating mechanism and the moving parts within each of the pole units. All the moving parts of each of the pole units are connected by rigid metal rods which pass through piping 320 which may be metallic and welded to the individual tanks. Thus, all moving contacts are, in effect, connected to one operating mechanism in the control cabinet, using only the single flexible bellows 319. This minimizes the hazard of leakage of gas from the tanks or into the tanks.

Referring to FIG. 28, the bushings 303 and 304 enter tank 312 through conductive cylinders 330 and 331, respectively, which have end rings 332 and 333, respectively, fastened to their bottoms. Cylinders 330 and 331 are formed in such a manner that a relatively uniform electrostatic field distribution is obtained along the lower surface of the bushing 303 and 304 and between the outside of shields 15 and 16 and the wall of tank 312. This is obtained by the symmetry shown and proper proportioning of the lower bushing termination and the inside surface of cylinders 330 and 331.

FIG. 30 shows a detailed view, partly in cross-section of a gas filled bushing which can be used for bushing 303 and cylinder 330 which is bolted to insulation column 340 as by bolts such as bolt 341. The main conductor 342 is fastened to a lower thrust plate 343 and an upper thrust plate and spring assembly 344 as by threading, to connect upper and lower insulation portions 345 and 346 together by compressive forces.

The lower end of the bushing is surrounded by shield 15 of FIGS. 1, 2 and 28. The lower end of cylinder 330 is terminated by the ring 332 which is in a plane normal to the axis of the bushing to provide a relatively uniform field between bushing 340 and tank 312, even though the bushing 303 passes through the tank wall at an oblique angle which otherwise would result in a non-uniform three-dimensional field. Thus, in FIG. 28, it is seen that it would be highly advantageous to arrange the bushings, tanks and bushing cylinders in this way to maintain adequate electrical clearance between the top ends of the bushings in atmospheric air, and, at the same time, achieve the required electrical clearance inside the tanks between live parts across the breaks; between live parts and ground parts; and at the same time achieving a minimum diameter and volume for tank 300.

FIG. 30 schematically shows a grading ring 350 disposed around the lower end of insulator portion 345 which is electrically connected to cylinder 330 which may be used to modify the electrostatic flux distribution around the top of the connecting flange 351 of insulator portion 345 and the flange 351 when mounted on the tank 312.

FIG. 30 also shows the equipotential lines of electrostatic flux in 10° increments when conductor 342 is energized and tank 312 is grounded. It will be seen that a nearly uniform tangential stress distribution is achieved along the surfaces of insulator portion 346, and a uniform radial stress is obtained between shield 15 and tank 312 and ring 332. Note that the relatively simple ring 332 is very effective in reducing the high local stresses at the junction between tank 312 and cylinder 330 which are inherent in the usual commercial joining operation.

Referring to FIGS. 28 and 29, suitable current transformers 360 and 361 are disposed around the exterior portions of bushings 303 and 304. Toroidal shaped grading rings 362 and 363, respectively, are disposed above current transformers 360 and 361, respectively, and serve the same functions as ring 350 of FIG. 30. The leads of the various current transformers 360 and 361 are connected within weatherproof junction boxes 364 and pass through conduits 365, 366 and 367 to be interconnected to one another and to the control housing 309. Conduits 364, 365 and 366 are rigid pipes which further serve to brace the top ends of the pole units 300, 301 and 302.

The connection of high and low pressure gas to the various parts of the system is best shown in FIG. 31. Thus, two conduits 370 and 371 extend from control cabinet 309 to tanks 310 and 311 to a high pressure. The tanks 310 and 311 are then connected by conduits 372 and 373 to the bottom, and interior of support insulators 14, FIGS. 28 and 29. Thus, high pressure tanks 310 and 311, support insulators 14 and interrupter tanks 13 are charged with high pressure sulfur hexafluoride gas at about 250 p.s.i.g. The interior of the large main tank 312 is maintained at a relatively low gas pressure such as 45 p.s.i.g., through conduit 375 which connects the tank 312 closest to cabinet 309 to the low pressure controls of cabinet 309. The remaining tanks of poles 301 and 302 are maintained at this same relatively low pressure by conduits 376 which communicate between the various tanks.

FIGS. 32 and 33 show details of portions of the operating mechanism shown in FIGS. 28 and 29. In FIGS. 32 and 33, there is provided a mounting plate 380 which carries a plurality of bearings 381 for rotating shaft and lever assembly 315 (see FIGS. 28 and 29 and lever 316). The bearings 381 are fastened to plate 380 and guide the shaft assembly 315 and permit rotational movement around the center line of shaft assembly 315.

Link or crank 316 is pivotally connected to link 317, while its other end is connected to shaft 203 (FIGS. 1 and 2). Link 317 extends through the bearing and gland assembly 319 which is suitably bolted to plate 380 and sealed thereto by seal 382. A gas seal 383 is maintained under fixed axial load by spring 384. A bearing 385 which may be of a suitable low friction self-lubricating material guides the lower end of link 317, and may be of Teflon. A similar material may be used for all other bearings and guides inside the breaker, e.g., components 170, 184, 192, 107, 108 and 125. This eliminates the need for bearing lubrication and minimizes the abrasive effect of any particles produced by a power arc such as metallic fluorides which may be produced when sulfur hexafluoride is exposed to a power arc.

FIGS. 29 and 31 show an accelerating spring assembly 390 located in each tank assembly which biases the linkage assembly including link 317 toward the breaker open position. Accelerating spring assembly 390 includes suitable compressive springs with suitable resilient over-travel stops to minimize decelerating forces at the end of the closing operation. This balances the accelerating forces between individual pole units and locates the stored energy in the springs close to the moving contacts without requiring transmission of high closing forces through the insulated operating rod 203.

When closing, the forces are transmitted from the operating mechanism in cabinet 309 through the metallic operating rods such as rod 317 into the accelerating opening springs 390. The insulated rod 203 need only transmit the relatively low compressive force required to accelerate the interrupter parts on closing and to overcome frictional and gas-pressure forces.

During opening, the accelerating forces are transmitted from mechanism 313 to the shaft assembly 315 and the insulating rod 203 transmits only the tension force required to accelerate the interrupter parts and overcome frictional and gas-pressure forces.

An additional compression accelerating spring 395 (FIG. 29) is located inside control cabinet 309 which also pushes the contacts toward their open position. Spring 309 is adjustable and permits minor adjustments of opening speeds of all moving contacts without requiring access to pressurized parts of the breaker. A dashpot 396, shown in FIG. 29, is suitably located to reduce acceleration forces produced at the end of the opening stroke.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A high voltage gas blast circuit breaker comprising, in combination: a low pressure main support tank of conductive material, first and second hollow pedestal insulators mounted within and on the bottom of said tank and extending upwardly toward the center of said tank, first and second hollow high pressure tanks mounted on the top end of said first and second pedestal insulators with the interiors of said hollow first and second tanks in communication with the interiors of said first and second hollow insulators, first and second interrupter structures mounted atop each of said first and second high pressure tanks and being immersed in the low pressure of said main support tank, first and second insulator bushings mounted on said main support tank and extending into the interior of said main support tank and connected to said first interrupter structures, respectively, said second interrupter structures connected to one another within said tank to define a series connection between said first and second insulator bushings of four interrupter structures, gas pressure supply means connected to said main tank and to said first and second hollow insulators for supplying gas at a given pressure to the interior of said main tank and gas at a higher pressure to the interior of said hollow insulators; said first and second interrupters each containing separable contact means connected in series with one another and with said first and second insulator bushings and high pressure gas chambers communicating with the interior of said first and second high pressure tanks, respectively; and a contact operating mechanism operated externally of said main tank and connected to each of said separable contact means.

2. The circuit breaker as set forth in claim 1 wherein said hollow pedestal insulators are parallel to one another; each of said first and second interrupters comprising generally elongated cylindrical structures having central axes; the axes of each of said first and second interrupters of each of said first and second high pressure tanks forming diverging angles with respect to one another as they extend from their respective high pressure tanks, thereby to define a generally V-shaped current path through each pair of said first and second interrupters; said insulator bushings being at a similar diverging angle with respect to one another and being coaxial with the axes of said first interrupters, respectively.

3. The circuit breaker as set forth in claim 1 wherein said main tank has a generally flattened circular shape with said first and second pedestal insulators lying in the major plane of said flattened shape.

4. The circuit breaker as set forth in claim 1 which includes an operating rod extending through an opening in the wall of said tank and connected between said contract operating mechanism within said tank and an external operating mechanism; and a flexible bellows connected between said opening and said operating rod to seal said opening and permit axial movement of said operating rod.

5. The circuit breaker as set forth in claim 1 which includes first and second hollow conductive cylinders concentrically surrounding the portions of first and second insulator bushings extending from the interior surface of the wall of said main tank to a position adjacent said first interrupters.

6. The circuit breaker as set forth in claim 5 which includes first and second corona rings connected to and surrounding the ends of said first and second conductive cylinders.

7. The circuit breaker as set forth in claim 4 which includes first and second axially movable operating rods each extending upwardly of the interior of said first and second pedestal insulators and connected to said separable contacts of said first and second interrupters, respectively; and connection means connecting said operating rod to said second operating rods.

8. The circuit breaker as set forth in claim 7 which includes first accelerating spring means connected to said operating rod and second accelerating springs connected to said second operating rods, respectively.

References Cited

UNITED STATES PATENTS

| | | | |
|---|---|---|---|
| 2,291,263 | 7/1942 | Thommen | 200—148 |
| 2,835,769 | 5/1958 | Milne et al. | 200—150 |
| 3,042,918 | 7/1962 | Casey | 174—18 X |
| 3,359,390 | 12/1967 | Frowein | 200—148 |

FOREIGN PATENTS

| | | |
|---|---|---|
| 1,301,864 | 7/1962 | France. |
| 1,037,551 | 8/1958 | Germany. |
| 616,709 | 2/1961 | Italy. |

ROBERT K. SCHAEFER, Primary Examiner

R. A. VANDERHYE, Assistant Examiner

U.S. Cl. X.R.

200—145